United States Patent [19]

Nigam

[11] Patent Number: 4,503,474
[45] Date of Patent: Mar. 5, 1985

[54] DISC DRIVE CARTRIDGE ARRANGEMENT

[75] Inventor: Anil Nigam, Cupertino, Calif.

[73] Assignee: SyQuest Technology, Fremont, Calif.

[21] Appl. No.: 384,927

[22] Filed: Jun. 4, 1982

[51] Int. Cl.³ .................. G11B 23/02; G11B 5/82; G11B 5/012; G11B 5/52
[52] U.S. Cl. .................. 360/133; 360/86; 360/97; 360/135
[58] Field of Search ............ 360/133, 135, 137, 97, 360/99, 86; 346/137

[56] References Cited

U.S. PATENT DOCUMENTS

| 3,315,840 | 4/1967 | Tollkuhn | 360/133 |
| 3,529,301 | 9/1970 | Hiruta | 360/133 |
| 4,091,454 | 5/1978 | Kauffmann | 360/97 |
| 4,166,622 | 9/1979 | Rager | 360/135 |
| 4,320,430 | 3/1982 | Vogt | 360/86 |
| 4,419,703 | 12/1983 | Gruczelak | 360/97 |

*Primary Examiner*—Robert M. Kilgore
*Attorney, Agent, or Firm*—Fliesler, Dubb, Meyer & Lovejoy

[57] ABSTRACT

A disc drive cartridge arrangement includes a hub clamp for engaging a spindle of a disc drive which clamp has inwardly spiralling fingers to reduce the space required therefor and to firmly engage the spindle, and a door and aperture arrangement which allows the heads of the disc drive to enter the cartridge from the upper and lower surfaces of the cartridge. The hub to which the disc of the disc drive cartridge arrangement is mounted includes a labyrinth seal arrangement for preventing contaminants from entering the interior of the housing.

15 Claims, 4 Drawing Figures

DISC DRIVE CARTRIDGE ARRANGEMENT

DESCRIPTION

1. Technical Field

The present invention relates to a disc drive cartridge arrangement for information storage and retrieval.

2. Background Art

A disc drive cartridge arrangement generally comprises a disc which is generally rigid and which is coated with a material upon which information can be stored magnetically. A housing is provided about the disc to protect the disc from environmental contamination. The disc is mounted on a hub which is in turn mounted through the housing such that the hub can engage with the spindle of a disc drive unit. The housing includes an aperture for allowing magnetic recording and reading heads to have access through the housing to the disc. The housing further includes a door arrangement which closes over the aperture when the disc drive cartridge arrangement is not in use to prevent contamination from entering the housing.

In designing a disc drive cartridge arrangement several considerations must be made. First, the cartridge must be designed in such a way that the possibility of contaminants entering the housing is minimized. Second, the cartridge must be designed in such a way that it is as thin as possible so as to reduce the storage area. Third, a clamp should be provided to the hub arrangement which can be conveniently and accurately positioned onto a spindle so that each time the cartridge is placed in the disc drive it can be positioned accurately and with great repeatability with respect to the magnetic reading and recording heads.

One commercially available disc drive cartridge arrangement includes a hub clamp which has three points of contact with the spindle. These points of contact are equally spaced about a circle and include two substantially flat surfaces which are stationary and together form a substantially V-shaped pocket and a third surface which is part of a leaf spring which urges the spindle against the two flat surfaces. With repeated insertion and removal of the clamp on the spindle, the surfaces which are metallic have a tendency to wear and thus change the center of the disc relative to the magnetic heads. Also due to the fact that discs are generally not perfectly balanced, there are dynamic loads on the clamp which also tend to cause some wear. With wear the repeatability of positioning of the disc relative to the recording heads is reduced and thus information from the disc can be lost or misread in open-loop actuated disc drive systems.

Another type of cartridge which is commercially available include a clamp which has a plurality of downwardly dependent jaws which are positioned to define a circular aperture which can snugly receive a spindle. The jaws are generally metallic and thus there is some wear when the jaws rub against the generally metallic spindle. However, the wear is usually more equal as all of the jaws would give in the same manner and thus generally wear in the same manner. However, it should be noted that in order to reduce the possibility of fatigue, the jaws are elongated in the direction which is downwardly from the cartridge so that as the jaws are displaced the jaws are not plastically stressed. In other words, the length of the jaws must be increased so that the stress on the jaws is reduced. Such a clamp does not make for a compact cartridge arrangement.

On many prior art cartridge arrangements, the hub and disc are spring loaded against the housing to keep the disc from unduly moving while in storage and also to prevent contamination from entering the housing from the space between the hub and the housing. When the cartridge is inserted into a disc drive the hub is urged upwardly as it is positioned over the spindle so that there is an opening between the hub and the housing. As the disc spins, a vacuum is created next to the surface of the spinning disc and contaminants can be drawn through this space. Obviously, such an arrangement is not advantageous.

Finally, most cartridges must be wide enough to accept the recording and reading heads which generally enter through an aperture in the peripheral side of the housing. It is important that the opening be sufficiently large so that there is enough room for the recording and reading head to be inserted into the housing without damage to the heads.

DISCLOSURE OF THE INVENTION

The present invention is directed in overcoming one or more of the problems as set forth above and in particular to providing a disc drive cartridge arrangement which has an effective and accurate hub clamp, is relatively thinner to provide for more data storage per volume of space occupied and is designed in such a way that the possibility of contamination of the disc is greatly reduced.

In one aspect of the invention, a disc drive cartridge arrangement comprises a housing, a hub means for rotably mounting the disc to the housing, said hub means including a self-centering spindle clamp having at least two inwardly extending and flexible fingers, said fingers being substantially disposed in any plane which is substantially perpendicular to an axis of the hub and said fingers being flexibly displacable in said plane, and door and aperture means for allowing access through the housing to the disc.

In another aspect of the invention, the clamp includes three fingers which spiral inwardly and which are adapted to engage and be equally spaced about the spindle. In yet another aspect of the invention, the fingers are comprised of a plastic which has a surface which has a low coefficient of friction.

In yet another aspect of the invention the hub means includes a labyrinth seal means for preventing contamination from entering between the housing and the hub.

In still another aspect of the invention wherein said housing includes first and second substantially parallel, planar sides and a peripheral side located between and secured to said first and second planar sides, the door and aperture means includes a first opening in said first planar side, a second opening in said second planar side located substantially in line with said first opening and a third opening in said peripheral side, with said first and second openings communicating with said third opening.

The cartridge further includes a door and means for urging said door over said first, second and third openings.

Accordingly, it can be seen from the above and the following that the present invention provides for a cartridge arrangement which can be smaller than presently available cartridges due to the compact and efficient hub clamp and also due to the door and aperture means which allows the heads to come through the planar sides of the cartridge and not just the peripheral side. Further this arrangement allows for relatively contamination free operation.

DETAILED DESCRIPTION OF THE PREFERRED EMBODIMENT

Figure 1:
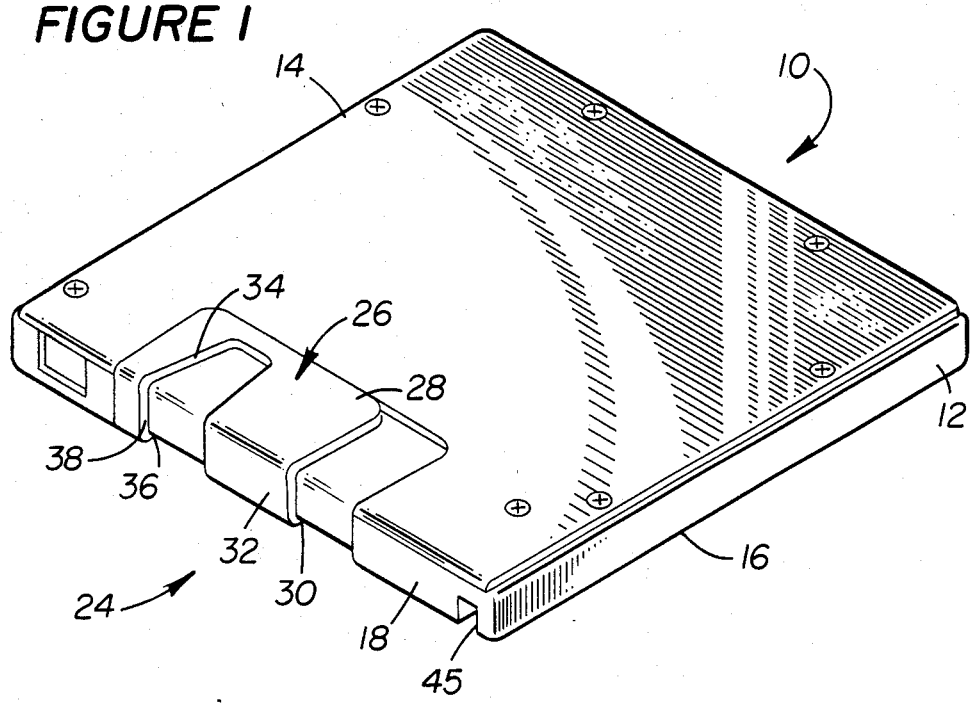
FIG. 1 is a perspective view of an embodiment of the invention.

With reference to the figures and in particular to FIG. 1, a disc drive cartridge arrangement is depicted and then designated by the numeral 10. Cartridge 10 includes a housing 12 which is comprised of two substantially planar and parallel upper and lower sides 14 and 16 and a peripheral side 18 which is substantially perpendicular to the upper and lower sides 14 and 16 in a preferred embodiment. Located inside the housing 12 is a disc 20 for magnetically storing information. The disc is secured to a hub 22 which hub is disposed through housing 12 as will be discussed herein below.

The disc drive cartridge arrangement 10 further includes a door and aperture means 24 which allows the reading and recording heads to access the disc 20. Door and aperture means 24 includes a door 26 which is substantially U-shaped in cross-section and is slidingly mounted to both the upper and lower sides 14 and 16 and is slidable over the portion of the peripheral side 18 which joins the above portions of the upper and lower slides 14 and 16. Door 26 defines a first side portion 28 which slides over the upper side 14, a second side portion 30 which slides over the lower side 16, and a peripheral portion 32 which joins the first and second portion 28 and 30 and slides relative to peripheral side 18. First and second side portions 28 and 30 define apertures 34 and 36, respectively, which are trapezoidal in shape in a preferred embodiment and which are lined-up one above the other. Apertures 34 and 36 communicate with an aperture 38 defined by the peripheral portion 32 of door 26. Door 26 further includes a linkage 40 which is secured to the peripheral portion 32 and which extends from the side of the peripheral portion 32 and engages a lever and cam arrangement 42 which is pivotally mounted to the housing by pin 44. The linkage 40 consists of a pin which engages into a slot in the cam and lever arrangement A2 so that the lever is capable of controlling the motion of the door in both directions so as to open and close the opening providing access to the recording heads. When cam and lever arrangement 42 is urged to pivot about pin 44, the linkage 40 is moved to the side, sliding the door towards the cam and lever arrangement 42. A torsion spring 46 is positioned in the housing 12 to urge the door 26 away from the lever and cam arrangement 42. The torsion spring slips over pin 44 with one leg loaded against the inside face of the lever 43 of lever and cam arrangement 42 and the other leg resting on a wall provided in 12.

The door and aperture means 24 further defines a first substantially trapezoidal shaped aperture 48 in the first planar side 14 and a second substantially trapezoidal aperture 50 in the second planar side 16, and an aperture 52 in the peripheral side 18 of the housing which communicates and joins the apertures 48 and 50. The apertures 34, 36 and 38 of the door 26 can be slid into alignment with the apertures 48, 50 and 52 of the housing through the lever and cam arrangement 42 to give the reading and recording heads (not shown) access to the disc through not only the peripheral side 18, but also through the upper side 14 and the lower side 16.

It is to be understood that if desired the door and aperture means is included only for example apertures 34 and 38 with apertures 48 and 52 provided in housing 12. A slot 45 is defined through the lower side 16 of the housing 12. Slot 45 is located directly below cam and lever 42. Slot 45 is additionally defined by a portion of the peripheral side immediately adjacent to the door 26. Through slot 45, a member (not shown) can be introduced to actuate the cam and lever 42 to open the door 26. The height of this member from side 16 is lower than the lever 47 on the arrangement 42 so as to provide no interference between the door linkage 40 in the fully open condition.

Figure 2:
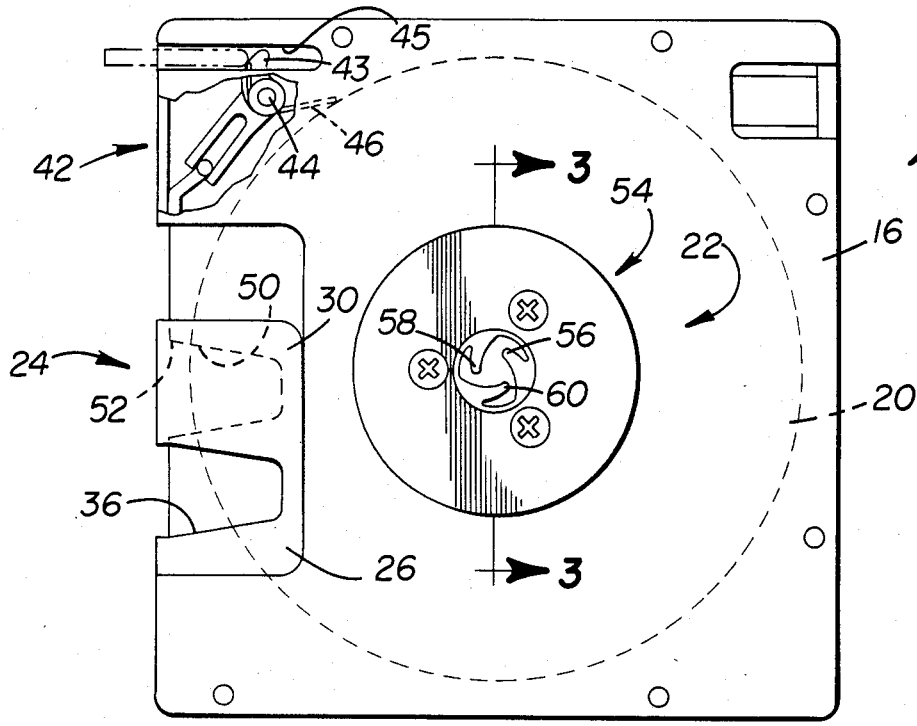
FIG. 2 is a bottom view of the embodiment of FIG. 1.
Figure 4:
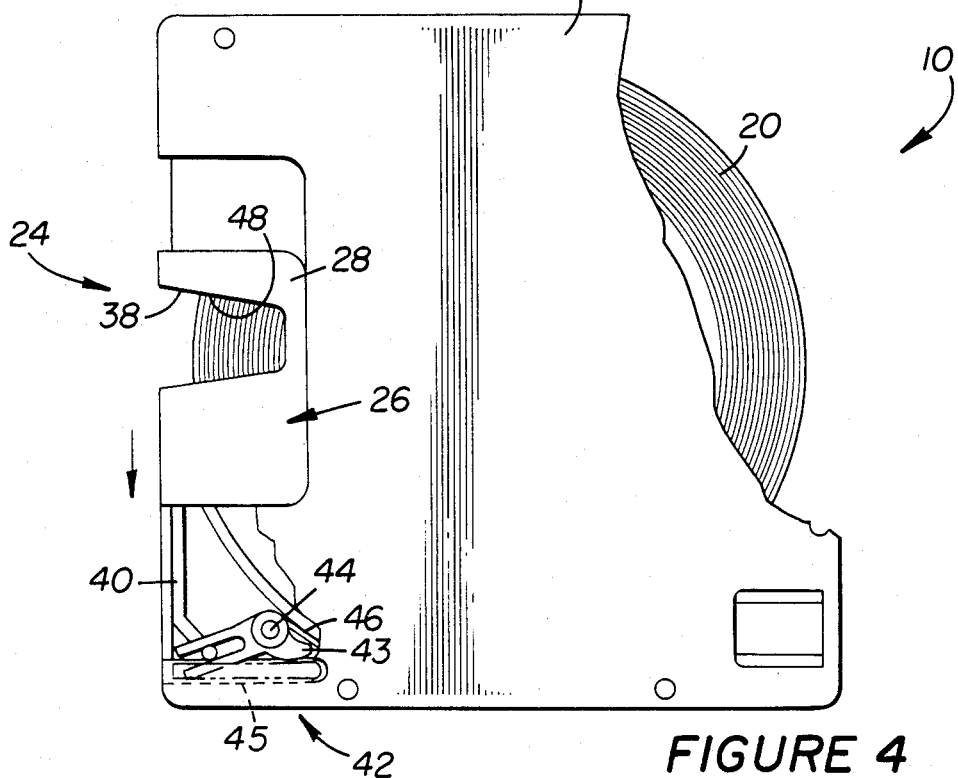
FIG. 4 is a partial top view of the embodiment of FIG. 1 with a portion thereof broken away.

The hub 22 includes a hub clamp 54 as shown at FIG. 2 which is located relative to the lower side 16 of the housing 12. Hub clamp 54 is designed for engaging a spindle (not shown) of a disc drive and accurately positioning the disc relative to the spindle. The hub clamp in a preferred embodiment includes fingers 56, 58 and 60 which extend from equidistance positions about the hub and spiral inwardly. The fingers 56, 58 and 60 are concavely oriented with respect to each other and the tip of each finger defines an internal space which has a radius which is slightly smaller than the radius of the spindle to be engaged. The fingers 56, 58 and 60 are designed such that they are always flexed under the flexural fatigue endurance limit of the material when they are pushed apart to accept the spindle. In a preferred embodiment, the fingers are comprised of a homopolymer acetal and in particular delrin 100. This material has been selected additionally for the fact that it is relatively slippery, having a low coefficient of friction, which aids the positioning of the fingers over the spindle along with an adequate flexural fatigue endurance limit. It is to be understood that other materials which have the same characteristics and which are fatigue resistant can equally be selected. As the fingers are equally spaced about the spindle and each applies the same pressure, the hub clamp 54 arrangement is self-centering. Further, as the hub clamp 54 is made of plastic, and the spindle is made of metal, the metal to metal contact of the prior art has been eliminated and also the wear associated therewith has been greatly reduced, along with the fact that any wear that may occur will be equal on all fingers and thus not effect the locational repeatability of the cartridge onto the spindle.

Figure 3:
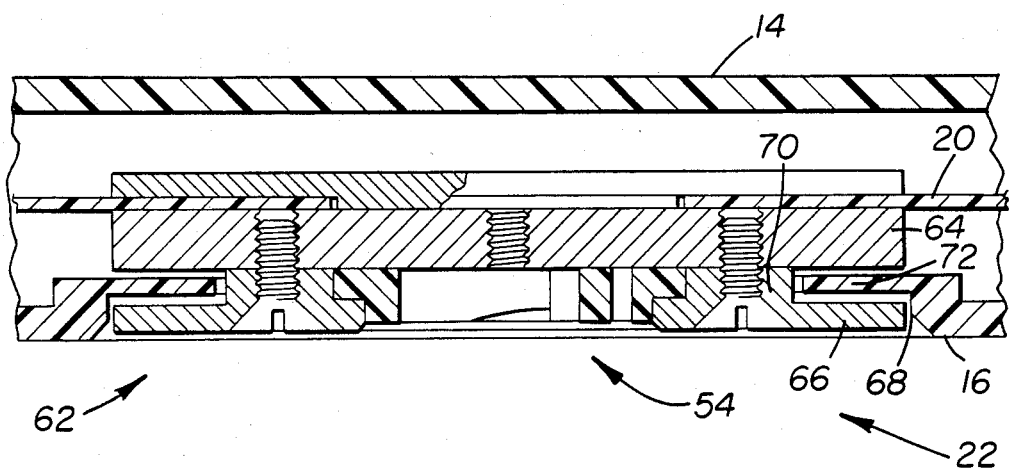
FIG. 3 is a sectional view taken through line 3—3 of FIG. 1.

The disc drive cartridge arrangement 10 further includes a labyrinth seal means of 62 (FIG. 3) for preventing dust and other contamination from being drawn into the inside of the housing 12 from an area immediately about the hub clamp 54. It is to be understood that a vacuum is created by the spinning of disc 20 and that this vacuum can draw outside contaminants into the cartridge arrangement 10. To avoid this situation, labyrinth seal means 62 includes a first hub disc 64 which comprises a portion of hub 22, and which is located immediately adjacent the lower side 16 of the housing 12. Labyrinth seal means 62 further includes a second hub disc 66 which is located externally to lower side 16, in a recess 68 defined by lower side 16. Hub discs 64 and 66 are spaced apart in substantially parallel planes. Second hub disc 66 includes a spacer means 70 whch extends therefrom into contact with first hub disc 64. Appropriate means such as bolts are used to secure the second hub disc 66 and spacer 70 to the first hub disc 64.

As can be seen in the figures, the diameters of first and second hub discs 64,68 are approximately equal and are substantially larger than the diameter of spacer 70. Also as can be seen on FIG. 3, the lower side 16 has an inwardly directed flange which is located between first and second hub discs 64 and 66 and which extends to a position immediately adjacent spacer 70. The hub clamp 54 is located on the second hub disc 66.

With such an arrangement, there is enough play between the seal means 62 and the housing 12 so that once the hub clamp 54 is positioned on the spindle (not shown), the seal means 62 and the disc 20 can be held from the housing 12 to allow disc 20 to spin freely. Due to the labyrinth seal arrangement 62 the amount of contaminants entering the interior of the housing 12 is greatly reduced.

Industrial Applicability

The operation of the disc drive cartridge arrangement 10 is as follows. The disc drive cartridge 10 is inserted in a disc drive (not shown) and as the hub clamp 64 comes into alignment with the spindle, an element of the disc drive extends into the slot 45 to open door 26. With door 26 open the aperture 34, 36 and 38 are aligned with apertures 48, 50 and 52 so that the heads (not shown) of the disc drive (not shown) can be deployed through the upper and lower sides 14 and 16 of the housing 12 into a position immediately adjacent to the upper and lower sides of the disc 20. The hub clamp 54 is at the same time urged down on to the spindle with the fingers 56, 58 and 60 thereof firmly engaging the spindle circumferentially. It is to be noted that the lever and clamp arrangement 42 is designed in such a way that the element (not shown) of the disc drive (not shown) when inserted into the slot 45 essentially pushes the lever and cam arrangement 42 out of the way as it proceeds therepast, after the door 26 is opened the proper amount.

From the above, it can be seen that the cartridge arrangement 10 allows for essentially contaminant free opeation in comparison with the prior art cartridges and also the door and aperture means 24 and the hub clamp 54 allows for the cartridge to be much thinner than the prior cartridges and still allow for proper alignment of the cartridge with respect to the spindle and also for sufficient clearances for the heads.

Other aspects, objects, advantages of the invention can be obtained from a study of the drawings, the disclosure and the appended claims.

I claim:
1. A cartridge with a data storage disc comprising:
a housing;
a hub means for rotatably mounting the disc to the housing;
said hub means including a self-centering hub clamp having at least two inwardly extending and flexible fingers, said fingers being substantially disposed in a plane which is substantially perpendicular to an axis of said hub, and said fingers being flexibly displaceable in said plane so that said fingers are displaceable perpendicularly to said axis of said hub; and
door and aperture means for allowing access through said housing to said disc.

2. The cartridge of claim 1 wherein said hub clamp includes three fingers which spiral inwardly and which are adapted to engage and be equally spaced about a spindle.

3. The cartridge of claim 2 wherein the end of each finger defines a radius which is substantially identical to the radius of the spindle.

4. The cartridge of claim 2 wherein the fingers are comprised of a plastic having a surface with a low coefficient of friction.

5. The cartridge of claim 1 wherein the fingers are substantially concave toward each other.

6. The cartridge of claim 1 wherein the hub means include a labyrinth seal means for preventing contamination entering between the housing and the hub.

7. The cartridge of claim 6 wherein the labyrinth seal means include:
a first hub disc located adjacent to the data storage disc;
a second hub disc located in a plane substantially parallel to and spaced from said first hub disc;
a spacer means for spacing the first hub from said second hub; said spacer means having a diameter which is substantially less than said first and said second hub discs;
said housing extending into the space between the first and second hubs to a location substantially adjacent to said spacer means such that said second hub disc is located externally to said housing.

8. The cartridge of claim 7 wherein said housing defines a recess for receiving said second hub disc.

9. The cartridge of claim 1 wherein:
said housing includes first and second substantially parallel planar side and a peripheral side located between and secured to said first and second planar sides; and
said door and aperture means include a first aperture in said first planar side, a second aperture in said second planar side located substantially in line with said first aperture and a third aperture in said peripheral side, with said first and second aperture communicating with said third aperture.

10. The cartridge of claim 9 wherein said door and aperture means includes:
a door; and
means for urging said door over said first, second and third apertures.

11. The cartridge of claim 10 wherein said door has a substantially U-shaped cross section and includes first and second side portions and means for slidably mounting said side portion relative to said first and second parallel planar sides of the housing, and a peripheral portion joining said first and second side portions, which peripheral portion is slidable relative to said peripheral side of the housing and wherein said door defines an aperture which can be aligned with the apertures of said housing.

12. The cartridge of claim 1 wherein:
said housing includes a substantially planar side and a peripheral side which is at an angle to the planar side; and
said door and aperture means includes a first aperture in said planar side and a second aperture in said peripheral side which communicate with said first aperture, and a door, and means for slidably disposing the door on said housing so that the door can be slid over the first and second apertures.

13. A cartridge with a data storage disc comprising:
a housing including first and second substantially parallel planar sides and a peripheral side secured between said first and second planar sides; and,
a door and aperture means for allowing access through said housing to said disc, said door and aperture means including a first aperture in said first planar side and a second aperture in said peripheral side, which second aperture communicates whith said first aperture, said door and aperture means including a door, and means for slidably disposing the door on said housing so that the door can be slid over the first and second apertures.

14. The cartridge of claim 13 wherein:
said door includes a first planar side and a peripheral side secured to said first planar side; and
said door includes a first aperture in said first planar side of said door, and a second aperture in said peripheral side of said door, with said first and second aperture communicating with each other and alignable with the first and second apertures in said housing.

15. The cartridge of claim 14 wherein:
said door and aperture means including a third aperture provided in said second planar side of said housing which communicates with said second aperture in said peripheral side and said housing and is substantially aligned with said first aperture in said first planar side of said housing;
said door including a second planar side secured to the peripheral side of said door so that said door has a substantially U-shaged cross section;
said door including a third aperture provided in said second planar side which is substantially aligned with the first aperture in said first planar side of said door, and which communicates with the second aperture in said door;
said first, second and third apertures in said housing being alignable with the first, second and third apertures of said door as said door is slidably disposed on said housing.

* * * * *

UNITED STATES PATENT AND TRADEMARK OFFICE
CERTIFICATE OF CORRECTION

PATENT NO. : 4,503,474
DATED : March 5, 1985
INVENTOR(S) : Anil Nigam

It is certified that error appears in the above-identified patent and that said Letters Patent is hereby corrected as shown below:

Column 7, line 12, "whith" should be -- with --.

Column 8, line 12, "U-shaged" should be -- U-shaped --.

Signed and Sealed this

Third Day of June 1986

[SEAL]

Attest:

DONALD J. QUIGG

*Attesting Officer*     *Commissioner of Patents and Trademarks*